INVENTOR.
Clarence B. Mills,
BY
Davis, Lindsey, Hibben & Noyes
Atty's.

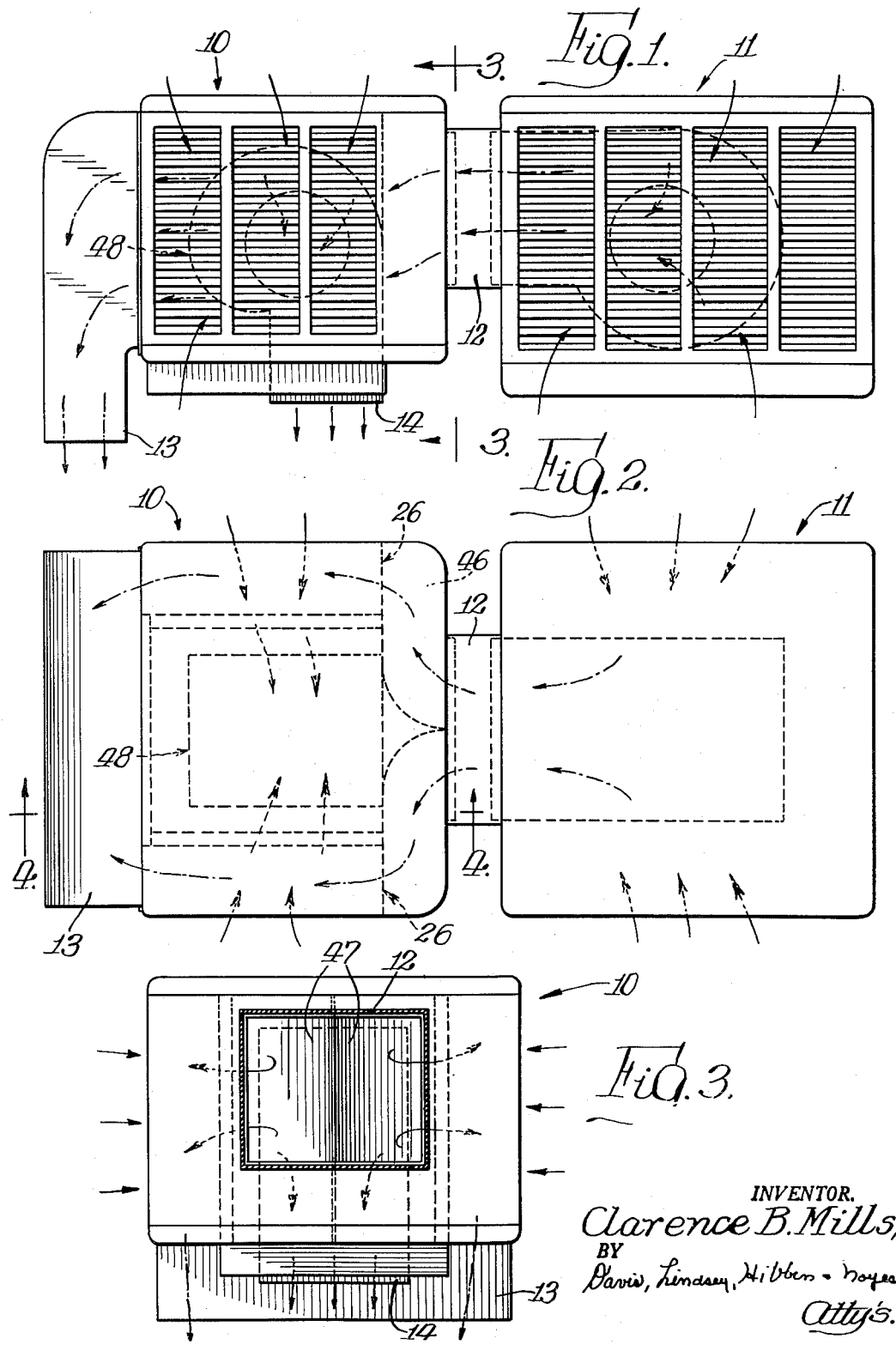

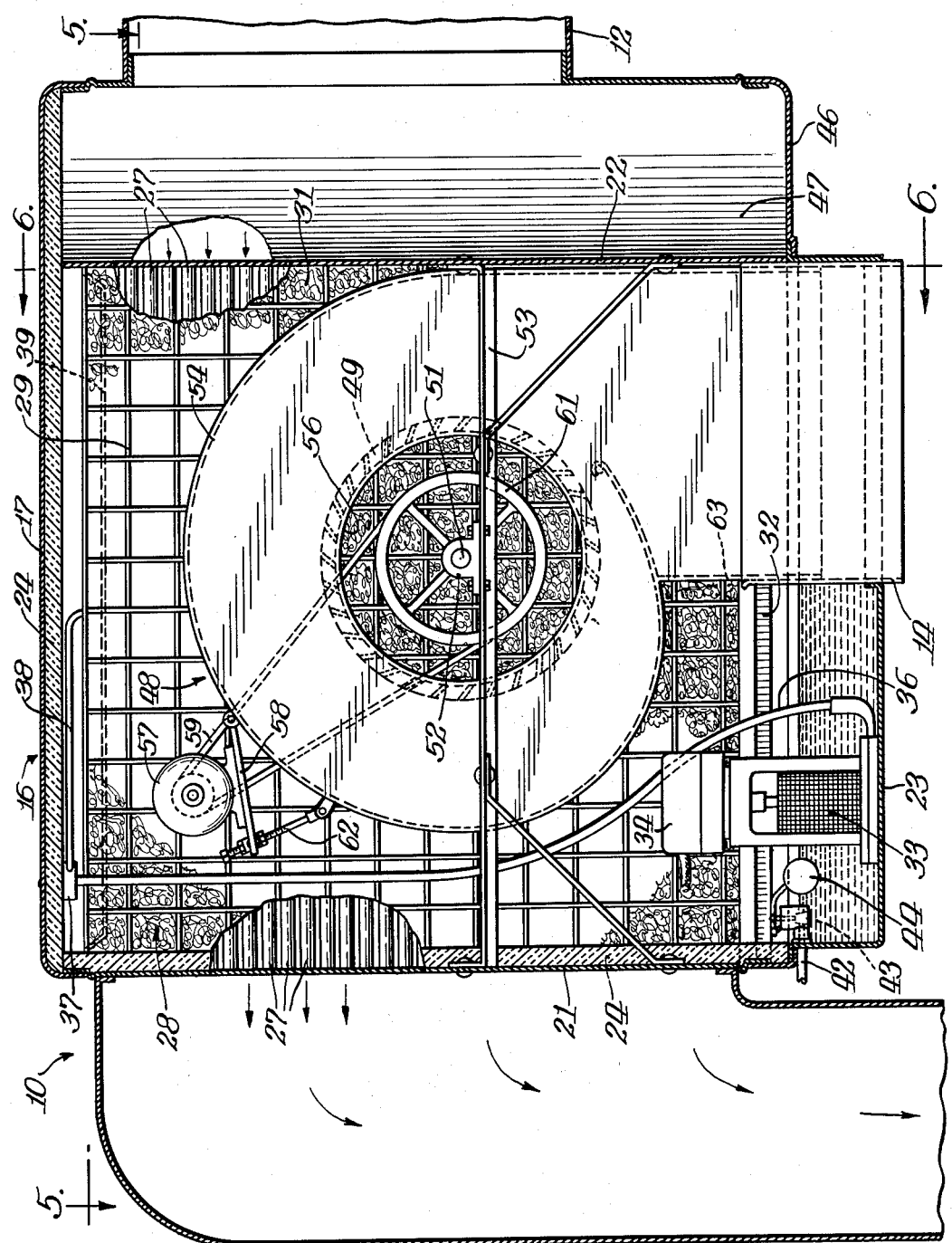

INVENTOR.
Clarence B. Mills,
BY
Davis, Lindsey, Hibben & Noyes
Atty's.

United States Patent Office 2,725,729
Patented Dec. 6, 1955

2,725,729

EVAPORATIVE TYPE AIR COOLER

Clarence B. Mills, Phoenix, Ariz.

Application May 26, 1954, Serial No. 432,391

21 Claims. (Cl. 62—139)

This invention relates to improvements in air cooling devices and more particularly to a novel cooler structure utilizing both dry and evaporative cooling principles.

It is well known in hot dry climates to employ evaporative type air coolers in which water is evaporated into the dry air in order to cool the air to its wet bulb temperature. However, with such an arrangement the total heat content of the air-water vapor mixture remains substantially unchanged. If it is desired to cool the air below its wet bulb temperature, the total heat content must be reduced and for such purpose, an additional cooling step is necessary. I have found that by a novel combination of dry stage cooling and wet stage or evaporative cooling, as hereinafter described in detail, I can provide a compact and highly effective air cooling arrangement which has numerous advantages over the systems heretofore in use.

Accordingly, a primary object of my invention is to provide a novel and improved air cooler utilizing a combination of dry cooling and evaporative cooling principles.

Another object of the invention is to provide a novel air cooler utilizing evaporative cooling principles but capable of reducing the temperature of the air below the temperature obtainable with an ordinary evaporative cooler.

A further object of the invention is to provide a novel air cooler having dry cooling and wet cooling stages and capable of producing cooler air containing less moisture and requiring less air circulation as compared with conventional evaporative coolers.

Still another object of the invention is to provide in an air cooler a novel structural arrangement for subjecting the air to successive dry and wet cooling.

An additional object of the invention is to provide a novel compact cooling unit capable of interconnection with an existing standard evaporative type air cooler for producing greatly improved cooling.

A still further object of the invention is to provide a novel unitary combination of auxiliary and main cooling units providing both dry and wet cooling stages and capable of delivering air at a lower temperature than an ordinary evaporative cooler.

Other objects and advantages of the invention will become apparent from the subsequent detailed description taken in conjunction with the accompanying drawings, wherein:

Fig. 1 is a side elevational view showing the general arrangement and flow paths through a main cooler and auxiliary cooler constituting one specific embodiment of the invention;

Fig. 2 is a top plan view of the apparatus seen in Fig. 1;

Fig. 3 is a vertical sectional view taken along the line 3—3 of Fig. 1;

Fig. 4 is a vertical sectional view on an enlarged scale of a portion of the apparatus as taken along the line 4—4 of Fig. 2;

Figure 5:
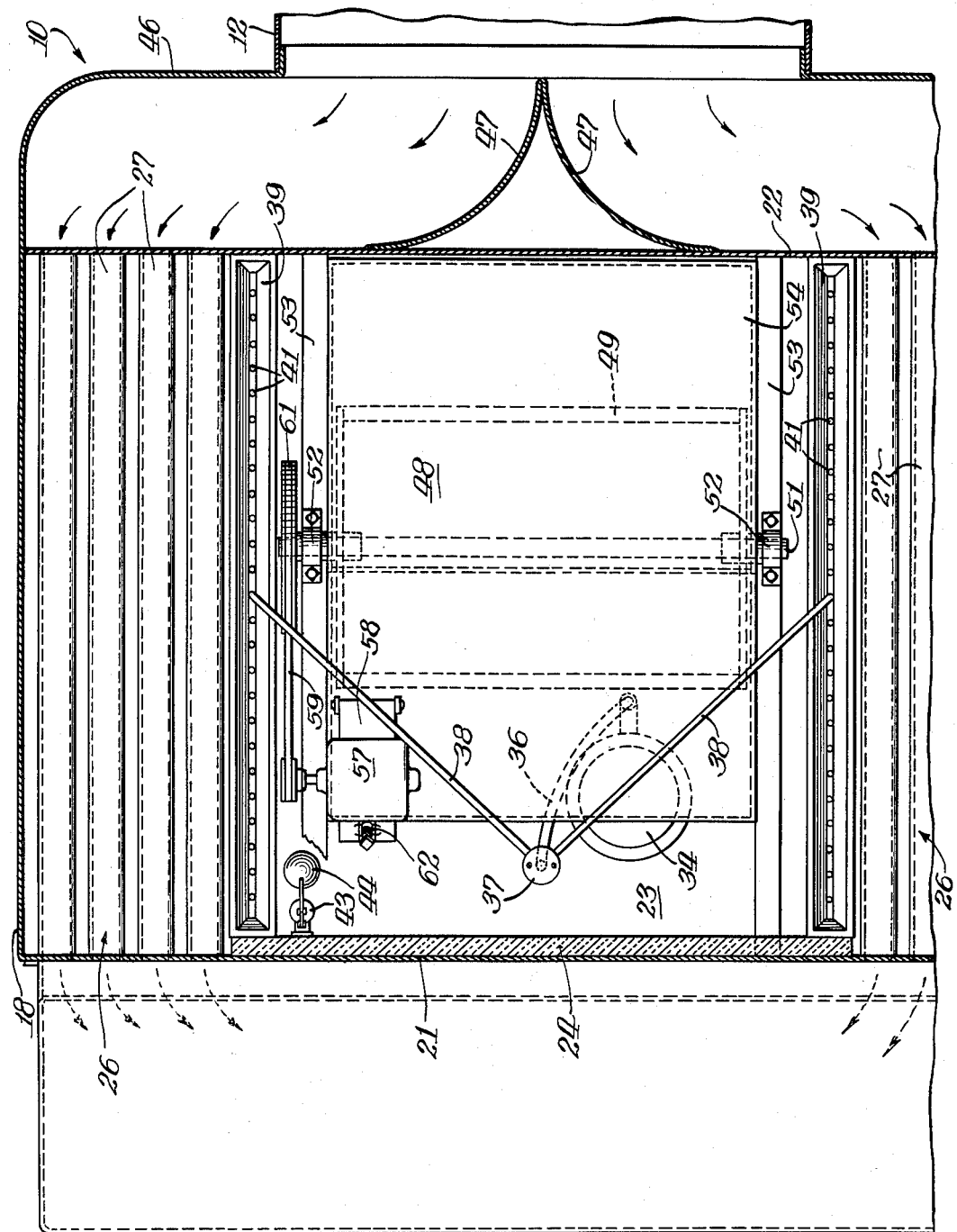
Fig. 5 is a horizontal sectional view as taken along the line 5—5 of Fig. 4.

Referring first to Figs. 1 to 3 of the drawings, one embodiment of my invention involves a main cooling unit, indicated generally at 10, and a separate auxiliary cooling unit 11 which serves as a source of supply of a cooling or heat exchange medium for unit 10. The two units are interconnected through a duct 12 which in many cases may conveniently be a flexible tubular connection. The unit 11 is in this instance a conventional side discharge air cooler of the evaporative type and need not be described in any further detail. The purpose of the unit 11 is to provide a source of pre-cooled air to be used as a heat exchange medium in unit 10, as will hereinafter appear, and it will, therefore, be understood that the unit 11 may comprise any suitable cooling device for supplying cooled air to unit 10. However, one of the important advantages of my invention resides in the fact that the unit 10 may be supplied or purchased separately and is attached by the simple duct connection 12 to an existing evaporative air cooler unit 11 whereby to obtain vastly improved cooling performance.

The unit 10, as described in detail below, consists of a dry cooling stage and a wet or evaporative cooling stage. As indicated by the arrows in Figs. 1 to 3, outside air is drawn into the unit 11 and the resultant cooled air passes through the connecting duct 12 and thence as an indirect heat exchange medium through the dry cooling stage of unit 10. This air is then discharged to waste through an outlet 13. Outside air is also drawn directly into the unit 10 and after passage successively through the dry and wet cooling stages is discharged downwardly through a bottom discharge outlet 14 into the residence or other room space to be cooled.

Figure 6:
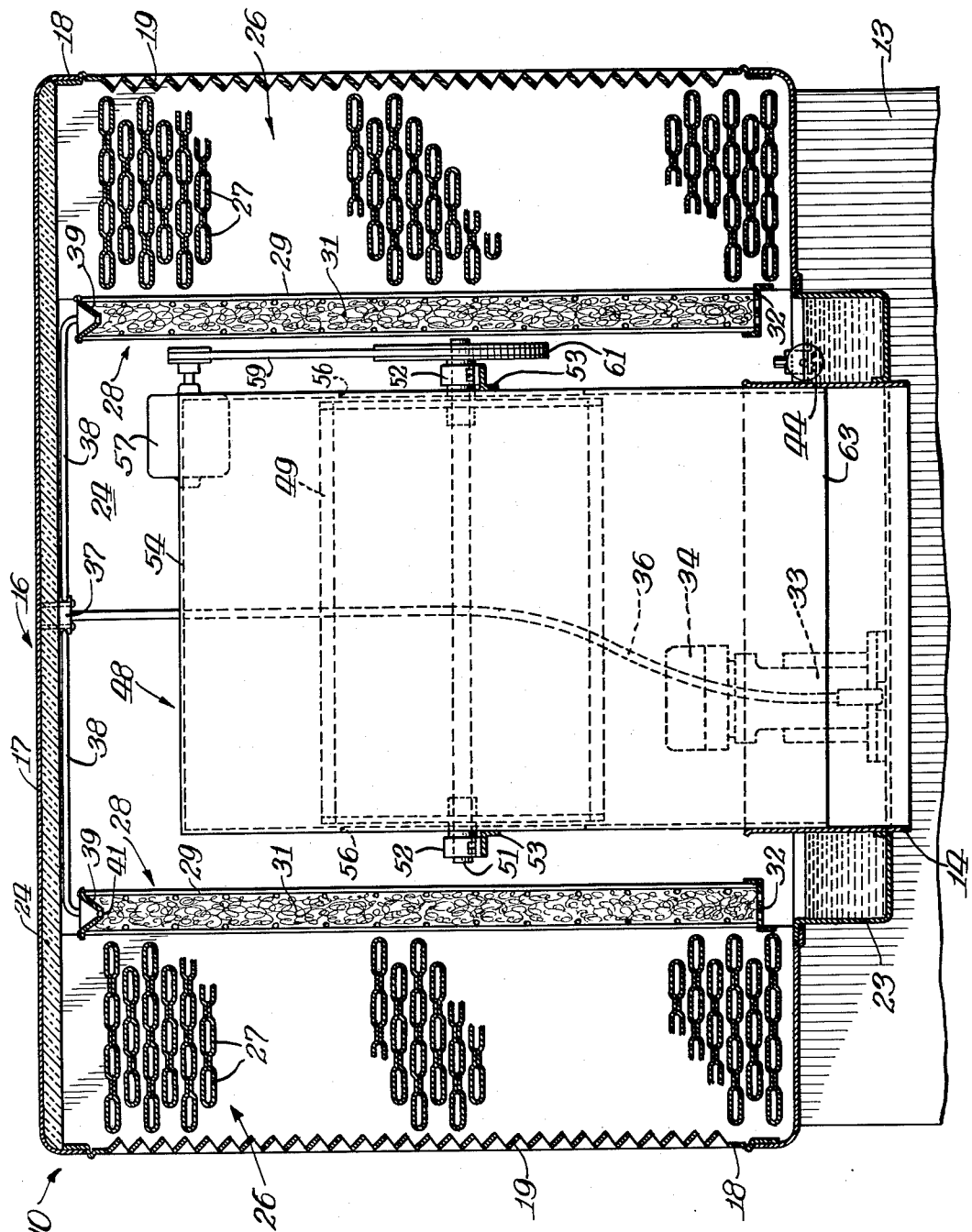
Fig. 6 is a vertical sectional view as taken along the line 6—6 of Fig. 4.

Referring now particularly to Figs. 4 to 6, the details of the unit 10 will be described. An outermost box-like housing 16 is provided having a main body portion with a top wall 17, oppositely disposed side walls 18 having openings or louvers 19 (Fig. 6), a pair of end walls 21 and 22, and a bottom 23 defining a liquid reservoir or tray. For maximum operating efficiency the top wall 17 and the end wall 21 are preferably lined with an inner layer of heat insulating material as at 24. At each of the opposite side walls 18 of the housing 16 a heat exchanger unit 26 is provided which may be of any suitable type. In the present instance each such unit consists of a bank of elongated confined tubular elements or passages 27 extending lengthwise between the end walls 21 and 22. The tubes 27 are staggered and spaced vertically (Fig. 6) to permit cross flow of outside air which enters through the louvers 19. Mounted immediately against the inner side of each of the tube banks or heat exchanger units 26 is an upright evaporative pad unit designated generally at 28 and comprising a wire rack or supporting frame 29 and a pad 31 of water absorptive fibrous material such as excelsior, aspen fiber, or the like. The pad units 28 are supported at their bottom edges by apertured channels 32 to permit gravity drainage of liquid downwardly through the pads.

For maintaining the pads saturated with a suitable evaporative liquid, such as water, a recirculating liquid system is provided including the bottom tray or reservoir 23 which may contain a bulk supply of water or other liquid as the case may be. A pump 33 driven by an electric motor 34 is disposed in the reservoir 23 and discharges liquid upwardly through a tube or conduit 36 to a metering or flow distributing device 37 secured to the top wall 17 of the housing 16. From the unit 37 water passes in more or less equal streams through a pair of supply tubes 38 to the tops of the pad units 28 and is discharged substantially at the mid-point of an elongated V-shaped trough 39 extending along the top edge of each pad 31. The troughs 39 are perforated or apertured, as at 41, along their length so that water is fed to the pads 31 in substantially uniform distribution throughout the pads. After the pads 31 become saturated, the excess water drains downwardly by gravity through the apertured channels 32 and is thereby returned to the supply reservoir 23. As the water is thus recirculated through the evaporative pads, a portion of the water is continuously lost by evaporation, as hereinafter described, and the reservoir 23 must, therefore, be replenished through a water supply pipe 42 (Fig. 4) which is fed from a suitable source under pressure (not shown). A control valve 43 is preferably provided in the line 42 and is actuated by a float control 44 for automatically maintaining a constant liquid level in the reservoir 23.

The tubular elements 27 of the heat exchangers or dry cooling zones 26 are supplied with precooled air from the unit 11 by passage of the cooled air from the duct 12 into a header 46 secured across the end wall 22 of the housing 16 and communicating with the inlet end of both banks of heat exchange tubes 27 at opposite sides of the unit 10. An upright partition consisting of a pair of curved plates 47 (Fig. 5) is disposed centrally within the header 46 for dividing the flow of incoming cooled air more or less equally between the two heat exchanger units 26. After passage through the tubes 27 of the heat exchangers 26, the cooling medium is then discharged through the outlet header 13 which extends across the housing end wall 21 and communicates with the outlet ends of both tube banks. From the discharge header 13 the used cooling medium is passed to waste. However, in the case of a residence having an attic space, the waste air from the outlet 13 may conveniently be fed to the attic space for additional cooling. This air may leave the attic by way of the roof dormers or other available exhaust.

The main cooling of the air to be supplied to the residence space is accomplished in two cooling stages in the unit 10 as previously mentioned. A blower device, indicated generally at 48, is provided within the housing 16 and comprises a rotor or bladed wheel 49 mounted on an axle 51 which extends transversely between the pads 28. The axle 51 is journaled in suitable bearings 52 carried on cross supports 53 which are rigidly secured to the housing 16. The usual casing 54 surrounds the rotor 49 and is provided with a pair of air inlet openings 56 disposed in between the pads 28 and the opposite axial ends of the rotor 49. A motor 57 is mounted on a pivotal support 58 secured to the casing 54 and has a belt drive connection 59 with a drive wheel 61 on one end of the axle 51 for driving the blower. A threaded adjustment 62 coacts between the motor support 58 and the casing 54 for maintaining the proper driving tension in the belt 59. A bottom discharge duct 63 extends downwardly from the blower casing 54 through the outlet or well 14 in the reservoir 23 for discharging cooled air into the residence space. For accommodating the air discharge duct 63, the reservoir 23 has a generally U-shaped configuration as seen in Figs. 4 and 6.

By the foregoing arrangement it will be seen that outside air flows successively through dry and wet cooling stages and is then discharged into the residence space. Thus, in the dry cooling stage outside air is drawn inwardly by the blower 48 through the louvers 19 and flows transversely across the tubes 27 in indirect heat exchange relation with the cooling medium passing through the interior of the tubes. Next, the preliminarily cooled air passes directly through the saturated pads 28 and is further cooled by evaporation of water into the dry air. As previously explained, the first stage dry cooling of the air overcomes the inherent inability of the evaporative cooling stage to cool the air below its wet bulb temperature.

By my invention, I can readily obtain cooled air which is 5° F. to 10° F. below the temperature of the air from an ordinary evaporative cooler and at the same time the actual moisture content of the air may be substantially lower than the moisture content of air from a standard evaporative cooler. Because of this increased cooling efficiency, less air may be circulated through the dwelling or residence space to accomplish the required cooling.

Figure 7:
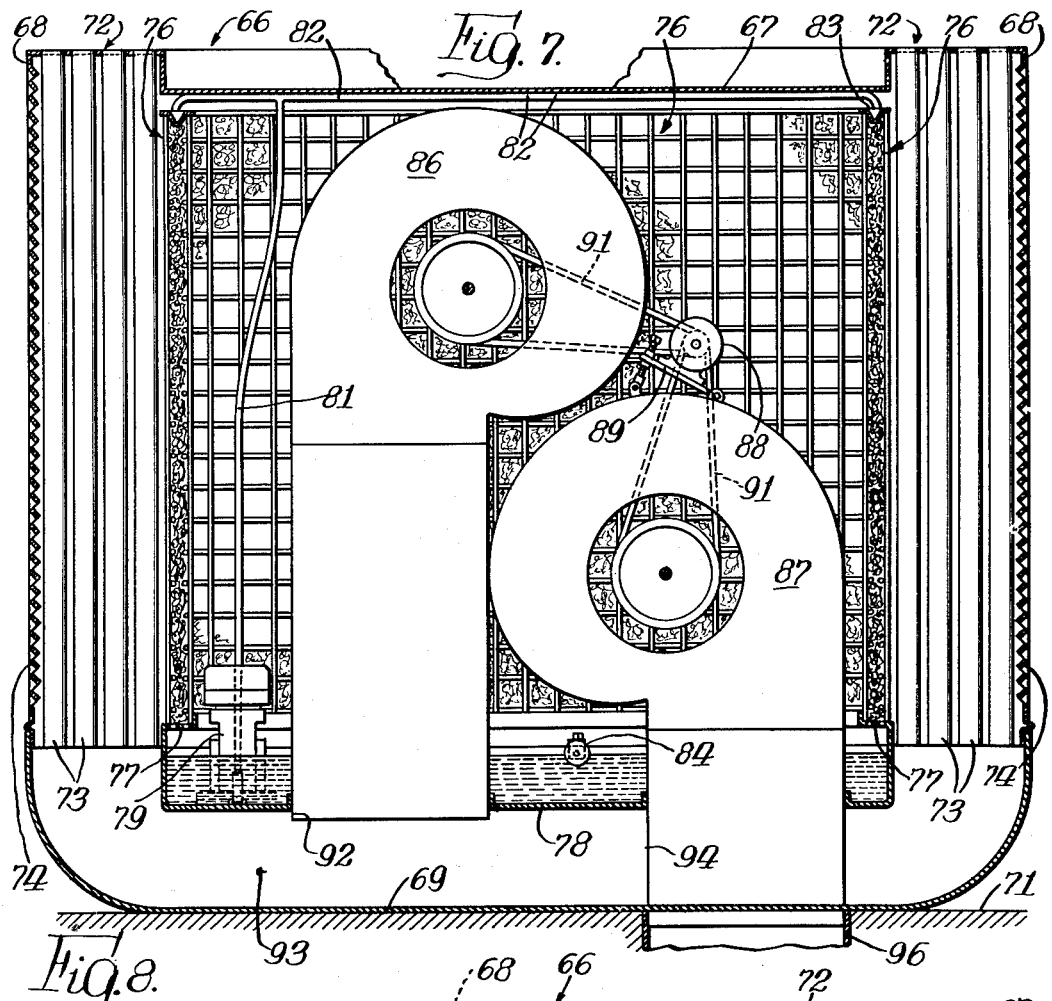
Fig. 7 is a vertical sectional view showing another embodiment of the invention.
Figure 8:
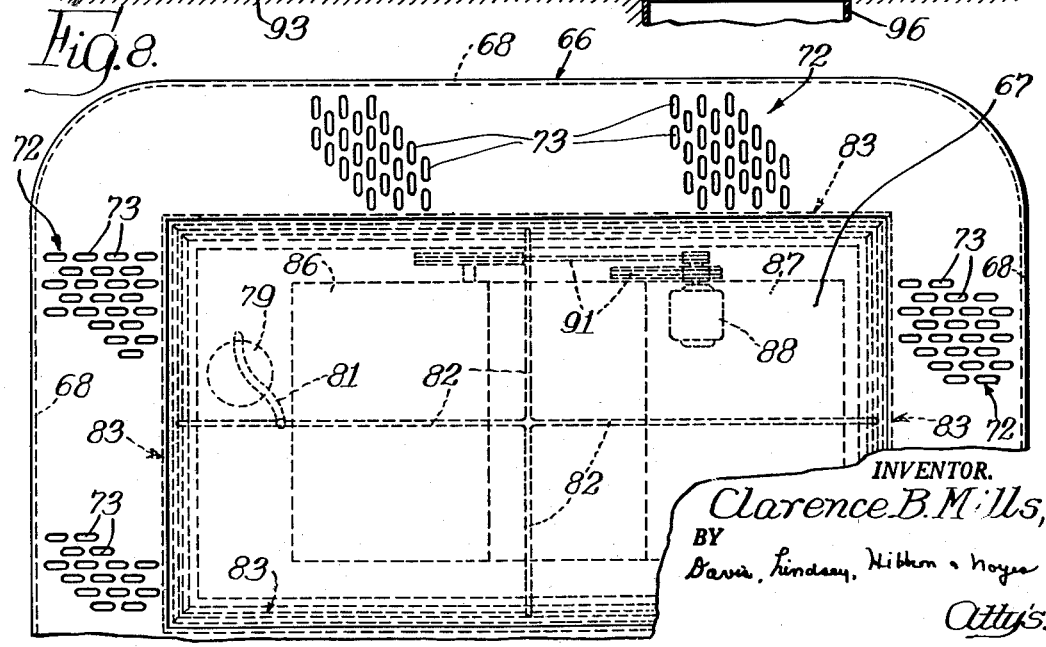
Fig. 8 is a fragmentary top plan view of the device shown in Fig. 7.

In Figs. 7 and 8 I have shown a modification of the invention comprising a unitary construction wherein both the main cooling unit and the auxiliary cooling unit are housed in a single box or enclosure and, in addition, all four sides of the rectangular housing are provided with heat exchange units and evaporative cooling pads. Thus, the housing is designated generally at 66 and has a top wall 67, four outer or side walls 68, and a bottom wall 69 defining a header for precooling air, as hereinafter described. The unit is shown, by way of example, as mounted on the roof of a building, the roof line being designated at 71. A tubular heat exchanger 72 having tubes 73 is mounted at the inside of each of the walls 68 with the tubes running in a vertical direction but staggered as before to permit cross flow of outside air entering through a plurality of sets of louvers 74.

In much the same manner as in the first-described embodiment of the invention, an upright evaporative pad unit 76 is disposed against the inner side of each heat exchanger unit and a plurality of apertured channels 77 are provided for supporting the pads and allowing drainage of water therefrom into a tray or liquid reservoir 78 suspended therebelow. A water circulating pump 79 draws water from the reservoir 78 and discharges it upwardly through a tube 81 and thence through a plurality of interconnected supply pipes 82 to perforated V-shaped troughs 83 extending along the top edges of the pad units 76. A float control valve means 84 in a water supply source (not shown) maintains a predetermined level in the reservoir 78.

A pair of rotary blowers 86 and 87, similar to the unit 48 hereinbefore described, are mounted within the housing 66 and are surrounded on all sides by the heat exchanger and evaporative pad arrangements. A motor 88 carried on an adjustable support 89 provides a common drive for both blowers through a pair of belts 91. The blower 86 comprises the auxiliary cooler blower and has a short bottom discharge duct 92 which extends through the reservoir 78 and terminates in an enlarged header or plenum chamber 93 defined by the bottom of the reservoir 78 and the housing base 69. Outside air is drawn inwardly through the heat exchanger units 72 and the evaporative pad units 76 and is discharged from the blower 86 into the chamber 93. The chamber 93 communicates with the lower ends of the tube banks in each of the heat exchanger units 72 so that the air from the blower 86 ultimately passes upwardly through the vertical tubes 73 and is then discharged, in this instance to waste, from the open upper ends of the tubes.

The main delivery of air to the residence space is accomplished by the blower 87 which likewise draws outside air inwardly through the side-by-side heat exchanger units 72 and evaporative cooling units 76. However, in this case a discharge duct 94 from the blower 87 extends downwardly through the reservoir 78 and also through the plenum chamber 93 and the bottom wall 69 of the cooler housing into a conduit 96 communicating with the residence space. Consequently, it will be seen that the same general principle of successive dry stage and wet stage cooling is involved with respect to the air being supplied to the residence space with all of the advantages attendant upon this scheme as previously described. However, the Fig. 7–8 arrangement differs in that the precooled air being supplied as heat exchange medium to the tubes 73 of the heat exchanger units 72 also passes through the latter as well as through the evaporative pad units 76.

Although the invention has been described with particular reference to certain specific structural embodiments, it is to be understood that various modifications and alternative structures may be resorted to without departing from the scope of the invention as defined in the appended claims.

I claim:

1. Air cooling apparatus comprising a housing, a pair of heat exchangers disposed in spaced relation at two sides of said housing and adapted to have a cooling medium passed therethrough, a pair of evaporative pads disposed in spaced relation adjacent said heat exchangers inwardly of said housing, means for supplying an evaporable liquid to said pads, and means in said housing between said pads for drawing air inwardly through said heat exchangers in indirect heat exchange relation with said cooling medium and thence through said pads in direct contact with said liquid.

2. Air cooling apparatus comprising a housing, a pair of heat exchangers disposed in spaced relation at opposite sides of said housing and adapted to have a cooling medium passed therethrough, a pair of evaporative pads disposed in spaced relation adjacent said heat exchangers inwardly of said housing, means for supplying an evaporable liquid to said pads, a blower disposed in said housing between said pads and having inlet means arranged to draw outside air inwardly through said heat exchangers in indirect heat exchange relation with said cooling medium and thence through said pads in direct contact with said liquid, and outlet means from said blower for discharging cooled air from said housing.

3. Air cooling apparatus comprising a housing, a pair of upright heat exchanger units disposed in spaced relation at opposite sides of said housing and adapted to have a cooling medium passed therethrough, a pair of upright evaporative pads mounted against the inner sides of said heat exchanger units, means for supplying an evaporable liquid to said pads, and a rotary blower mounted in said housing between said pads with its axis of rotation extending transversely between the pads, said blower having air inlet means at its opposite axial ends for drawing air inwardly through said heat exchanger units in indirect heat exchange relation with said cooling medium and thence through said pads in direct contact with said liquid, and said blower also having air outlet means for discharging cooled air from said housing.

4. Air cooling apparatus comprising a housing, a pair of upright heat exchanger units disposed in spaced relation at opposite sides of said housing and adapted to have a cooling medium passed therethrough, a pair of upright evaporative pads mounted against the inner sides of said heat exchanger units, means for supplying an evaporable liquid to said pads, a rotary blower mounted in said housing between said pads with its axis of rotation extending transversely between the pads, and a blower casing surrounding said blower within said housing, said casing having air inlet openings between said pads and the opposite axial ends of the blower for drawing air inwardly through said heat exchanger units in indirect heat exchange relation with said cooling medium and thence through said pads in direct contact with said liquid, and said casing having an air outlet extending through said housing for discharging cooled air from the apparatus.

5. Air cooling apparatus comprising a housing, a pair of heat exchangers disposed in spaced relation at opposite sides of said housing and adapted to have a cooling medium passed therethrough, a pair of evaporative pads disposed in spaced relation adjacent said heat exchangers inwardly of said housing, a reservoir in said housing adapted to contain a supply of evaporable liquid and arranged to receive liquid drainage from said pads, means for supplying liquid from said reservoir to said pads, and a blower disposed in said housing between said pads for drawing air inwardly through said heat exchangers in direct heat exchange relation with said cooling medium and thence through said pads in direct contact with said liquid.

6. Air cooling apparatus comprising a housing, a pair of upright heat exchanger units disposed in spaced relation at opposite sides of said housing and adapted to have a cooling medium passed therethrough, a pair of upright evaporative pads mounted against the inner sides of said heat exchanger units, a reservoir at the bottom of said housing adapted to contain a supply of evaporable liquid, said pads being disposed over said reservoir for drainage of liquid from the pads into the reservoir, pump means for supplying liquid from said reservoir to the tops of said pads, and a blower mounted in said housing between said pads for drawing air inwardly through said heat exchanger units in indirect heat exchange relation with said cooling medium and thence through said pads in direct contact with said liquid.

7. Air cooling apparatus comprising a housing, a pair of upright heat exchanger units disposed in spaced relation at opposite sides of said housing and adapted to have a cooling medium passed therethrough, a pair of upright evaporative pads mounted against the inner sides of said heat exchanger units, a reservoir at the bottom of said housing adapted to contain a supply of evaporable liquid, said pads being disposed over said reservoir for drainage of liquid from the pads into the reservoir, pump means for supplying liquid from said reservoir to the tops of said pads, and a blower mounted in said housing between said pads for drawing air inwardly through said heat exchanger units in indirect heat exchange relation with said cooling medium and thence through said pads in direct contact with said liquid, and an outlet extending from said blower downwardly through said reservoir for discharging cooled air from the apparatus.

8. Air cooling apparatus comprising a housing, a pair of heat exchangers disposed in spaced relation at opposite sides of said housing and adapted to have a cooling medium passed therethrough, a pair of evaporative pads disposed in spaced relation adjacent said heat exchangers inwardly of said housing, a reservoir in said housing adapted to contain a supply of evaporable liquid and arranged to receive liquid drainage from said pads, means for supplying liquid from said reservoir to said pads, and a blower disposed in said housing between said pads for drawing air inwardly through said heat exchangers in indirect heat exchange relation with said cooling medium and thence through said pads in direct contact with said liquid, and air outlet means extending from said blower through said reservoir for discharging cooled air from the apparatus.

9. Air cooling apparatus comprising a housing, a pair of upright heat exchanger units disposed in spaced relation at opposite sides of said housing and adapted to have a cooling medium passed therethrough, a pair of upright evaporative pads mounted against the inner sides of said heat exchanger units, a reservoir at the bottom of said housing adapted to contain a supply of evaporable liquid, said pads being disposed over said reservoir for drainage of liquid from the pads into the reservoir, pump means for supplying liquid from said reservoir to the tops of said pads, a rotary blower mounted in said housing between said pads with its axis of rotation extending transversely between the pads, a blower casing surrounding said blower within said housing, said casing having air inlet openings between said pads and the opposite axial ends of the blower for drawing air inwardly through said heat exchanger units in indirect heat exchange relation with said cooling medium and thence through said pads in direct contact with said liquid, and an outlet duct extending from said casing downwardly through said reservoir for discharging cooled air from the apparatus.

10. Air cooling apparatus comprising a housing, a pair of upright heat exchanger units disposed in spaced relation at opposite sides of said housing, said units each comprising a plurality of elongated confined tubular passages extending lengthwise of said housing, an inlet header at one end of said housing for supplying a cooling medium to said tubular passages, an outlet header at the opposite end of said housing for discharging the cooling medium from the heat exchanger units, a pair of upright evaporative pads mounted in spaced relation in said housing against the inner sides of said heat exchanger units, means for supplying an evaporable liquid to said pads, and a blower mounted in said housing between said pads and having air inlet means adjacent the pads for drawing outside air inwardly through said heat exchanger units in transverse flow across said tubular passages and in indirect heat exchange relation with the cooling medium in said passages and thence through said pads in direct contact with said liquid.

11. The apparatus of claim 10 further characterized in that said inlet header has upright partition means for dividing the flow of cooling medium between said heat exchanger units.

12. Air cooling apparatus comprising a housing, a pair of upright heat exchanger units disposed in spaced relation at opposite sides of said housing, said units each comprising a plurality of elongated confined tubular passages extending lengthwise of said housing, an inlet header at one end of said housing for supplying a cooling medium to said tubular passages, an outlet header at the opposite end of said housing for discharging the cooling medium from the heat exchanger units, a pair of upright evaporative pads mounted in spaced relation in said housing against the inner sides of said heat exchanger units, a reservoir at the bottom of said housing below said pads, said reservoir being adapted to contain a supply of an evaporable liquid and said pads being arranged for drainage of liquid therefrom into said reservoir, means for supplying liquid from said reservoir to the tops of said pads, and a blower mounted in said housing between said pads and having air inlet means adjacent the pads for drawing outside air inwardly through said heat exchanger units in transverse flow across said tubular passages and in indirect heat exchange relation with the cooling medium in said passages and thence through said pads in direct contact with said liquid.

13. Air cooling apparatus comprising a housing, a pair of upright heat exchanger units disposed in spaced relation at opposite sides of said housing, said units each comprising a plurality of elongated confined tubular passages extending lengthwise of said housing, an inlet header at one end of said housing for supplying a cooling medium to said tubular passages, an outlet header at the opposite end of said housing for discharging the cooling medium from the heat exchanger units, a pair of upright evaporative pads mounted in spaced relation in said housing against the inner sides of said heat exchanger units, a reservoir at the bottom of said housing below said pads, said reservoir being adapted to contain a supply of an evaporable liquid and said pads being arranged for drainage of liquid therefrom into said reservoir, means for supplying liquid from said reservoir to the tops of said pads, and a blower mounted in said housing between said pads and having air inlet means adjacent the pads for drawing outside air inwardly through said heat exchanger units in transverse flow across said tubular passages and in indirect heat exchange relation with the cooling medium in said passages and thence through said pads in direct contact with said liquid, and an outlet duct extending from said blower downwardly through said reservoir for discharging cooled air from the apparatus.

14. In combination, a main air cooling unit including a housing, a pair of heat exchangers disposed in spaced relation at opposite sides of said housing, a pair of evaporative pads mounted in spaced relation against said heat exchangers inwardly of said housing, means for supplying an evaporable liquid to said pads, and a blower mounted in said housing between said pads for drawing outside air inwardly through said heat exchangers and thence through said pads in direct contact with said liquid, an auxiliary air cooling unit adapted to discharge a supply of cooled air, and means interconnecting said auxiliary and main air cooling units for passing cooled air from said auxiliary unit through said heat exchangers in indirect heat exchange relation with the air drawn by said blower into the main unit.

15. In combination, a main air cooling unit including a housing, a pair of upright heat exchangers disposed in spaced relation at opposite sides of said housing, said heat exchangers each comprising a plurality of elongated confined tubular passages extending lengthwise of said housing, an inlet header at one end of said housing communicating with the tubular passages in both of said heat exchangers, an outlet header at the opposite end of said housing communicating with the opposite ends of said passages, a pair of upright evaporative pads mounted in spaced relation in said housing against the inner sides of said heat exchangers, means for supplying an evaporable liquid to said pads, a blower mounted in said housing between said pads and having air inlet means adjacent the pads for drawing outside air inwardly through said heat exchangers in transverse flow across said tubular passages and thence through said pads in direct contact with said liquid, an auxiliary air cooling unit adapted to discharge a supply of cooled air, and a duct interconnecting said auxiliary unit with said inlet header for passing cooled air from the auxiliary unit as a cooling medium through the tubular passages in said heat exchangers in indirect heat exchange relation with the air drawn by said blower into the main unit.

16. The combination of claim 15 further characterized in that said inlet header has an upright partition for dividing the flow of cooling medium from said auxiliary unit between said heat exchangers.

17. Air cooling apparatus comprising a housing, cooling means at the sides of said housing including a plurality of heat exchanger units and a plurality of evaporative pad units inwardly of the heat exchanger units, means for supplying an evaporable liquid to the pad units, a pair of blowers in said housing arranged to draw air inwardly through said heat exchanger units and thence through said pad units, means for passing discharge air from one of said blowers through said heat exchanger units as a cooling medium for and in indirect heat exchange relation with incoming air, and outlet means from the other of said blowers for discharging cooled air from the housing to a space to be cooled.

18. The apparatus of claim 17 further characterized in that said housing is generally rectangular in cross-section and said heat exchanger units and adjacent pad units are provided at all four sides of the housing.

19. Air cooling apparatus comprising a housing, cooling means at the sides of said housing including a plurality of heat exchanger units and a plurality of evaporative pad units inwardly of the heat exchanger units, a reservoir disposed below said pad units and adapted to contain a supply of evaporable liquid, means for supplying liquid from said reservoir to said pad units, a pair of blowers in said housing arranged to draw air inwardly through said heat exchanger units and thence through said pad units, said reservoir being spaced above the bottom of said housing to define a plenum chamber therebetween communicating with said heat exchanger units, outlet means from one of said blowers extending downwardly through said reservoir for supplying discharge air therefrom to said plenum chamber and thence through said haet exchanger units as a cooling medium for and in indirect heat exchange relation with incoming air, and an outlet from the other of said blows extending downwardly through said reservoir and through said plenum chamber for discharging cooled air from the apparatus to a space to be cooled.

20. Air cooling apparatus comprising a housing, a plurality of heat exchanger units at the sides of said housing and each comprising a plurality of elongated upright tubular elements, means defining a plenum chamber at the bottom of said housing for introducing a cooling medium to the lower ends of said tubular elements, an evaporative pad mounted against each of said heat exchanger units inwardly of said housing, means for supplying an evaporable liquid to said pads, a pair of blowers in said housing and arranged to draw air inwardly through said heat exchanger units in transverse flow across said tubular elements and thence through said pads, outlet means from one of said blowers communicating with said plenum chamber whereby air from said one blower passes upwardly from said plenum chamber through said tubular elements as the cooling medium for and in indirect heat exchange relation with incoming air, and outlet means from the other of said blowers for discharging cooled air from the housing to a space to be cooled.

21. The apparatus of claim 20 further characterized in that said upright tubular elements have open upper ends at the top of said housing for discharging the cooling medium from the housing.

References Cited in the file of this patent

UNITED STATES PATENTS

| | | |
|---|---|---|
| 1,962,572 | Richardson | June 12, 1934 |
| 2,165,979 | Nicholson | July 11, 1939 |